(12) United States Patent
Glennon et al.

(10) Patent No.: US 8,505,053 B2
(45) Date of Patent: Aug. 6, 2013

(54) USER INTERFACE HAVING READING LENS

(75) Inventors: Stephen Glennon, Lafayette, CO (US);
Steve Johnson, Boulder, CO (US);
Stephen Buck, Boulder, CO (US); Peter F. Brown, Washingtonville, NY (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 13/458,276

(22) Filed: Apr. 27, 2012

(65) Prior Publication Data
US 2012/0278840 A1 Nov. 1, 2012

Related U.S. Application Data

(60) Provisional application No. 61/479,656, filed on Apr. 27, 2011.

(51) Int. Cl.
*H04N 5/445* (2011.01)
(52) U.S. Cl.
USPC .................................. 725/56; 725/40; 725/44

(58) Field of Classification Search
None
See application file for complete search history.

(56) References Cited

U.S. PATENT DOCUMENTS

| | | | |
|---|---|---|---|
| 7,634,789 B2 * | 12/2009 | Gerba et al. ................... | 725/44 |
| 2008/0046928 A1 * | 2/2008 | Poling et al. .................... | 725/40 |

* cited by examiner

*Primary Examiner* — Chris Parry
*Assistant Examiner* — Oschta Montoya
(74) *Attorney, Agent, or Firm* — Great Lakes Intellectual Property, PLLC.

(57) ABSTRACT

A user interface, such as a graphical user interface or other electronic displayable interface, is contemplated. The user interface may include a reading lens portion configured to facilitate providing expanded viewing of content from other portions of the display. The reading lens portion may be displayed according to a non-linear timeline as to facilitate identifying upcoming contents without being constrained by a linear timeline used in other portions of the user interface.

9 Claims, 8 Drawing Sheets

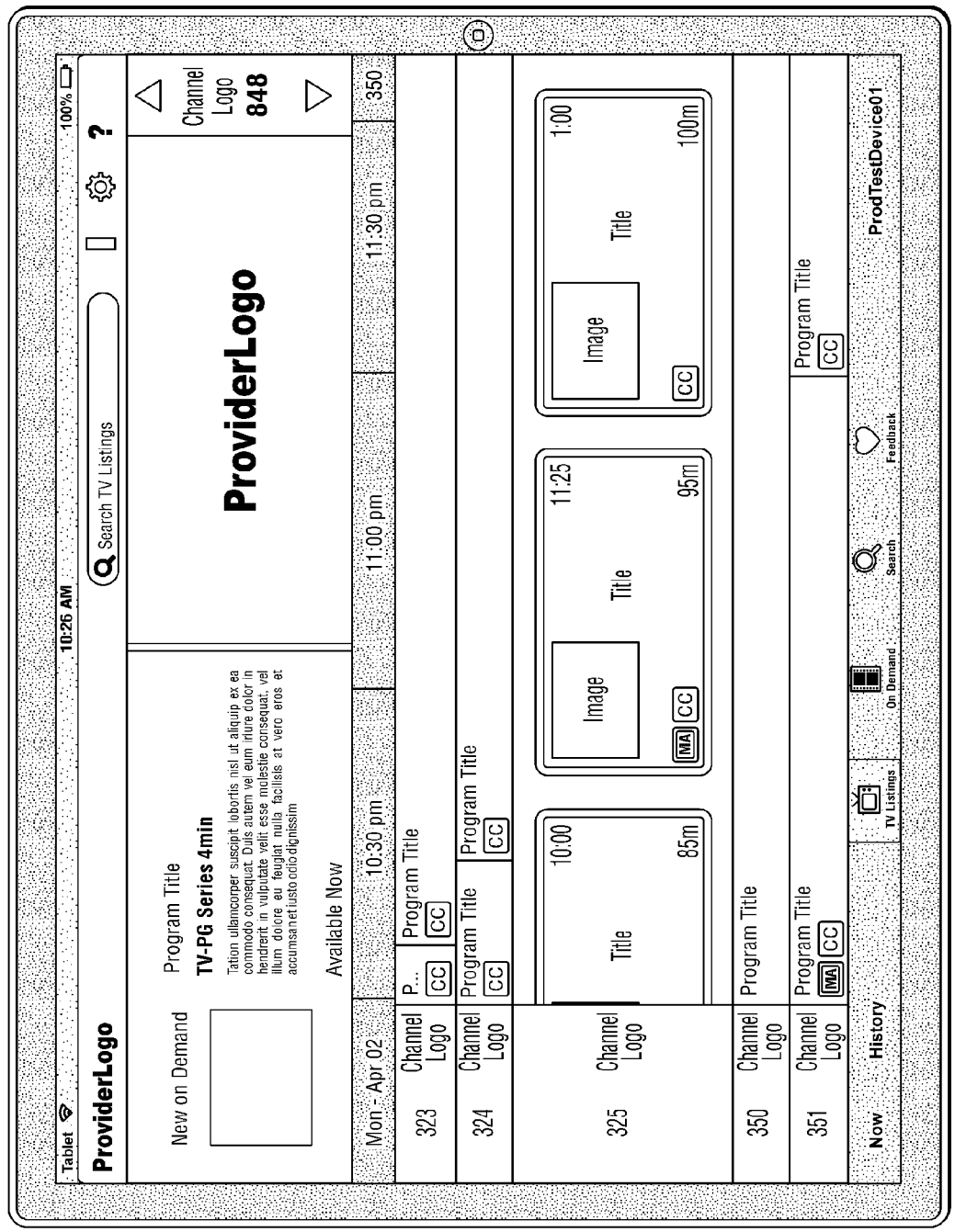

Fig. 8

USER INTERFACE HAVING READING LENS

CROSS-REFERENCE TO RELATED APPLICATIONS

This application claims the benefit of U.S. provisional Application No. 61/479,656 filed Apr. 27, 2011, the disclosure of which is incorporated in its entirety by reference herein.

TECHNICAL FIELD

The present invention relates to user interfaces, such as but not necessarily limited to graphical user interfaces or other electronically displayable user interfaces.

BACKGROUND

FIG. 1 illustrates a traditional electronic programming guide (EPG) 10 for use in selecting a television program for viewing. The EPG is characterized as a grid guide since it includes a plurality of cells 12 arranged according to channel number, viewing time, and program title. A user may change the displayed program titles by adjusting one of the channel number and the viewing time. This type of grid guide configured EPG maintains the illustrated appearance throughout operation in that each of the grid cells display basically the same type of information regardless of the channel numbers and/or viewing times being displayed. A top portion of the EPG may provide additional information beyond that shown in a lower, grid guide portion, such as by displaying additional information for a selected one of the grid cells. While it may be helpful to provide the additional information within the top portion, the EPG is somewhat limited to providing additional information for only a single one of the program titles. It may be desirable to provide a better expanded view of additional information for more than one of the program titles.

BRIEF DESCRIPTION OF THE DRAWINGS

FIGS. 3-7 illustrate scrolling as contemplated by the present invention.

FIG. 8 illustrates a user interface as contemplated by one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
FIG. 1 illustrates a traditional electronic programming guide (EPG) for use in selecting a television program for viewing.
Figure 2:
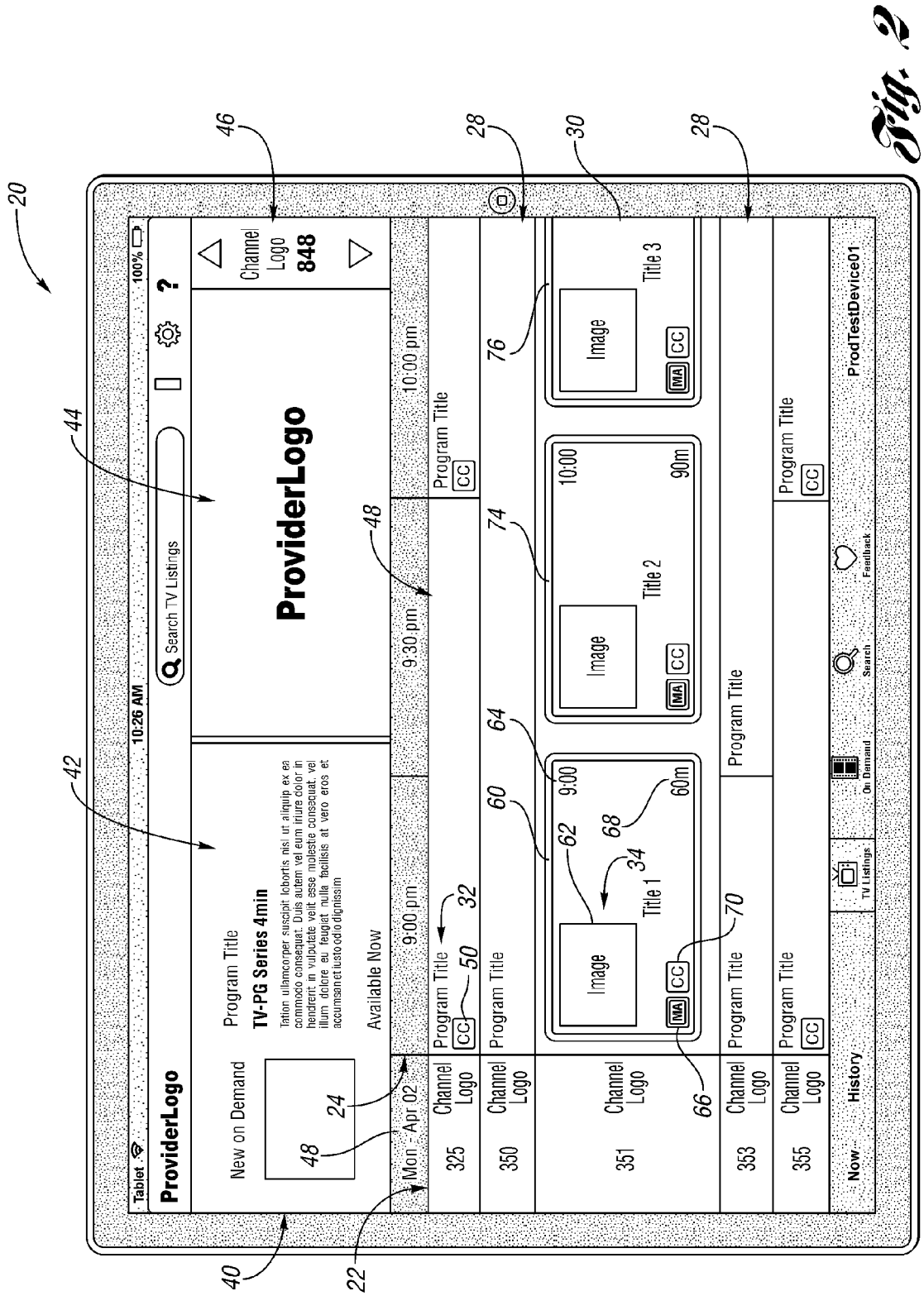
FIG. 2 illustrates a user interface as contemplated by one non-limiting aspect of the present invention.

FIG. 2 illustrates a user interface 20 as contemplated by one non-limiting aspect of the present invention. The user interface 20 is shown to be configured to facilitate selecting a television program, or more particularly a title associated with a television program. The television program may be selected according to a channel number 22 and a viewing time 24. The channel number 22 may represent a signaling stream or other electronic medium used to transmit the corresponding television program. The viewing time 24 may relate to a given period of time or other scalable marker sufficient to designate transmission of a television program. The use of the user interface is predominately described with respect to this television-based implementation; however, the present invention fully contemplates the user interface 20 being sufficient to facilitate selection of any type of content and not just television related content. The user interface 20, in particular, may be beneficial to facilitate selecting any type of electronically transmissible content where transmission occurs as a combination of signal addressing (e.g., channel number) and program scheduling (e.g., viewing time).

The user interface 20 is shown to be displayed within a display of a tablet computer. The display may be a touchscreen type of display where a user is able to perform manipulations to the user interface 20 with their finger or with pointer based movements. The user interface 20 may be graphically represented according to rendering instructions stored from a non-transitory computer-readable medium associated with the tablet. The computer-readable medium may include computer-readable code embodied therein for controlling the tablet to electronically facilitate selection of a television program in a manner contemplated by the present invention. The user interface 20 may be any type of graphical user interface (GUI), human-computer interface (HCI), and/or man-machine interface (MMI). The user interface 20 need not necessarily be rendered through the tablet computer. In particular, the present invention fully contemplates the use of the user interface 20 with a set top box (STB), a television, or other type of display with which a user desiring to access or otherwise select content may interact. The tablet is noted as one non-limiting aspect of the present invention leveraging off of wireless communication capabilities of the tablet to direct or instigate subsequent controls according to the selected television program.

The tablet, for example, may be particularly beneficial in facilitating remote control of a STB, a digital video recorder (DVR), personal video recorder (PVR), a television, a mobile/cellular phone, a voice over Internet protocol (VoIP) device, etc. The user interface may be configured in the illustrated manner to facilitate implementing any number of television-based controls, such as but not limited to changing a channel of a television, setting a recording, and/or reviewing programming related information (e.g., parental ratings, synopsis, duration/running time, start time, and time, closed-captioned capabilities, clips, images, trailers, contact information, advertisements, usage rates, high definition capabilities, 3-D capabilities, etc.). The use of the tablet may be particularly beneficial with providing the contemplated remote control since the signals commanding the desired action may be issued from the tablet over a wireless network, a cellular network, or the like for receipt by the to be controlled device and/or a system operator or multiple system operator (MSO) associated with the to be controlled device or otherwise related to facilitating transmission of the selected television program.

The user interface 20 is shown to include a grid portion 28 and a reading lens portion 30. The grid portion 28 and the reading lens portion 30 may be arranged relative to the channel number column 22 and the viewing time row 24 to facilitate identifying television program titles according to the time of day and the channel carrying the corresponding television program. Program information 32, 34 shown within the grid portion 28 and the reading lens portion 30 may be changed with a scrolling operation where a user selects a portion of the grid portion 28 or the reading lens portion 30 and therefrom drags a finger in a certain direction. This directional dragging may be used to control the speed and direction with which the television program information may change. A vertical type of directional dragging may be used to actuate the displayed channel members 22 in an upward or downward fashion to facilitate displaying different channel members. A horizontal type of directional dragging may be used to actuate the displayed viewing times 24 in a forward or backward fashion to facilitate displaying different viewing times. This directional dragging may be used to control the displayed program information 32, 34 so that a user can easily locate television programs desired for selection, i.e., to facilitate inputting a related control command for the selected television program.

The user interface 20 is shown to include a top portion 40 having a first window 42 for displaying additional information for a selected one of television program titles, such as to display an image representative of the corresponding television program, a synopsis of the program, and additional related information. A second window 44 may be included in the top portion to facilitate advertisements or display of other information that may not necessarily be attending to a selected one of the displayed television program titles. A third window 46 may be included in the top portion to facilitate input of a particular television channel number to be selected for quickly changing the television channel currently being up by a television, such as by directly importing the number upon selection of the third window 46 (a keyboard may be displayed with the selection) and/or with use of corresponding directional arrows where the channel number showing at the time of ceasing actuation of one of the directional arrows is automatically tuned to by the television. A current date may be shown within a fourth window 48 proximate the channel numbers 22 and viewing times 24 to facilitate notifying a user of the date to which the currently displayed viewing times and channel numbers relate. The user interface 20 is shown to be configured in this manner for exemplary non-limiting purposes as the present invention fully contemplates user interface 20 being configured to facilitate displaying various types of information in addition to or place of that which is illustrated.

The grid portion 28 may be comprised of a plurality of grid cells 48 (only one labeled) where each grid cell displays the television program title and a minor graphical indicator 50, such as the illustrated close captioning indicator. The grid cells 48 may have the same height and different widths that approximate a remaining running time of the corresponding television program. The grid cells 48 may be considered to be arranged in a linear manner since the width of each grid cell is set to correspond with a first timeline associated with the viewing times 24. The first timeline is shown to correspond with a range of half hour increments beginning with 9 PM and ending at 10 PM. The reading lens portion may be comprised of a plurality of reading lens cells 60 where each reading lens cell 60 displays additional information beyond that which would be displayed the same television program within the grid portion 78. This expanded view of the related program information 34 may be used, for example, to additionally display an image 62, a start time 64, a rating 66, a remaining running length 68, and/or a closed captioning 70 associated with the corresponding television program. The reading lens cells 60 may be configured to be of the same height and width, regardless of the duration of the corresponding television program. (One of the reading lens cells is shown to be cropped; however, it will have the same size as the other two illustrated the reading lens cells once scrolled leftwardly.)

The reading lens cells 60 may be considered to be organized in a non-linear manner since the width of each cell is not proportional to a remaining running length of the corresponding television program. As shown, one of the reading lens cells 60 corresponding with the program having remaining running time of 60 minutes is shown to have the same width as the following television program having a remaining running time of 90 minutes. This sizing commonality of the reading lens cells 60, and particularly that the cells 60 provide an expanded view and/or additional information for the related television program, is believed to be beneficial in allowing a user to see the upcoming division program titles without having to actuate the first timeline (e.g., viewing time 24) to a viewing time corresponding with the program. The first reading lens grid cell 60 is associated with a program having a remaining running length of 60 minutes and the second reading lens grid cell 74 is associated with a program having remaining running length of 90 minutes. These two programs 60, 74 have a combined remaining running time of two half hours, which is exceeds the viewing time shown within the first timeline, effectively providing a second timeline. When coupled with the third reading lens grid cell 76, the reading lens portion 30 is able to visually display the closest three programs corresponding with the currently selected range of channel numbers and viewing times.

The ability to present the three programs in the reading lens portion 30 may be beneficial in allowing a user to quickly reference the three programs 60, 74, 76 without having to perform a scrolling operation or otherwise manipulate the user interface 70 beyond the current timing increments of the first timeline corresponding with the grid portion 78. While three reading lens cells 60, 74, 76 are shown, the present invention fully contemplates the use of any number of reading lens cells 60, 74, 76 and is not necessarily limited to the use of three. Optionally, the number of displayed reading lens cells 60, 74, 76 may be selected by the user or set according to a desired profile created for the user. While the reading lens portion 30 is shown to be horizontally orientated in a parallel manner to the first timeline, the present invention fully contemplates arranging the reading lens portion 30 with other orientations. The reading lens portion 30 may, for example, be vertically orientated relative to an outer side of the display, i.e., rightward of the last viewing time, such that the three upcoming programs 60, 74, 76 are vertically shown, optionally with the same height and width as illustrated, e.g., by stacking the three reading lens cells 60, 74, 76 at top of each other. The corresponding channel number may retain the appearance it would present if shown within the grid portion 28, optionally with an arrow or other indicator to show his relation to the vertically orientated reading lens portion. Of course, this is one exemplary alternative to the illustrated configuration the present invention fully contemplates the use of other reading lens configurations.

The illustrated reading lens configuration is believed to be beneficial in providing a reading lens type of expanded view of contents will therethrough. The reading lens portion 30 is shown to be anchored approximate a middle of the channel numbers 22 to present this reading lens type of experience. Of course, the reading lens portion 30 can be shifted upwardly and downwardly relative to this central position as desired, such as in response to receiving a request from a user of information included within the user profile. The reading lens portion 30 and the grid portion 28 may be similarly responsive to the directional dragging of a finger or other pointer in order to change the displayed program information 32, 34 in one or both of the grid portion 28 and the reading lens portion 30. One non-limiting aspect of the present invention contemplates controlling an acceleration at which the displayed program information 32, 34 is changed according to how quickly the directional dragging takes place and/or as a function of a distance of which the directional dragging takes place across the display.

Figure 3:
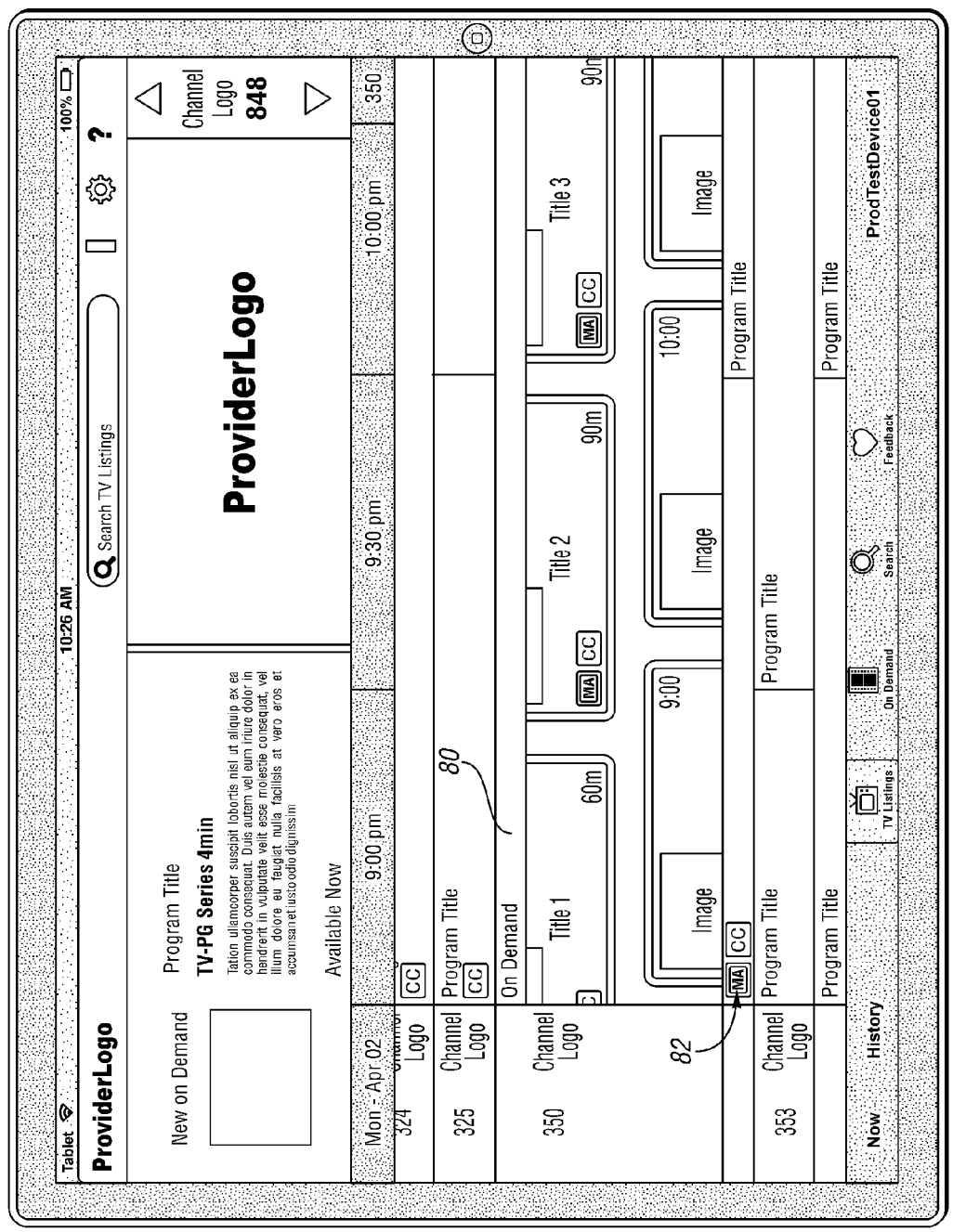
Figure 4:
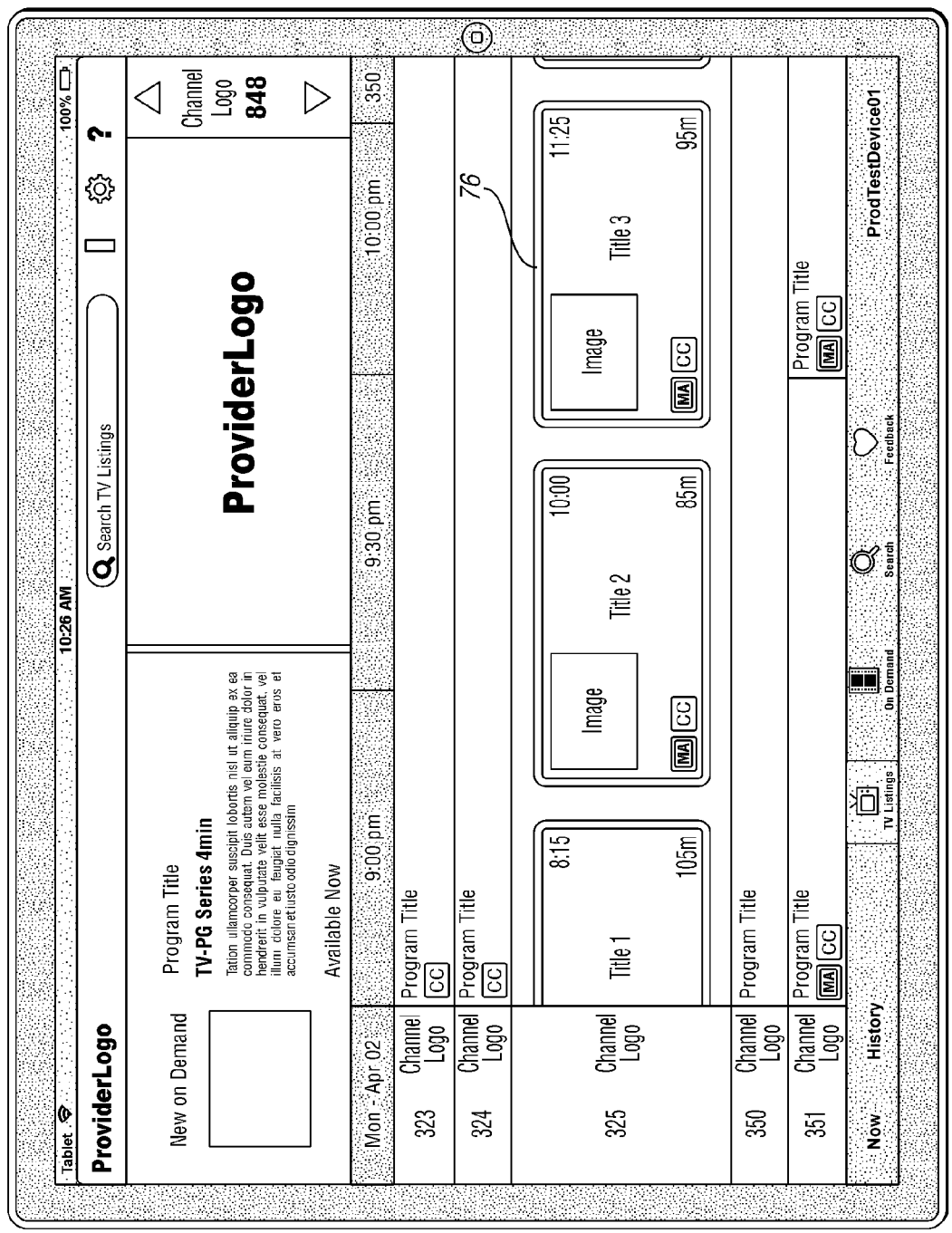

FIG. 3 illustrates scrolling of the user interface 70 where the directional dragging corresponds with a generally vertical, downward movement. This directional dragging causes program information 80 shown within a preceding grid cell to begin sliding into the reading lens portion 30 and program information 82 of the reading lens programs 60, 74, 76 corresponding sliding into a subsequent grid cell 82. FIG. 3 may be considered to be an in-process view in that the directional dragging operation is in the process of completing, i.e., it simultaneously shows the incoming program information and the outgoing program information within the reading lens portion 30, which are both representative of the three closest television programs of the incoming channel. The in-process view may correspond with a splitting of the corresponding incoming grid cell 80 and outgoing grid cell 82 such that partial information also appears therein. FIG. 4 illustrates the continued downward directional dragging operation when the user ceases movement after dragging a distance sufficient to temporarily illustrate the program information associated with channel 350 within the reading lens portion before terminating the dragging operation such that the program information corresponding with channel number 325 comes to rest within the reading lens portion 30.

Figure 5:
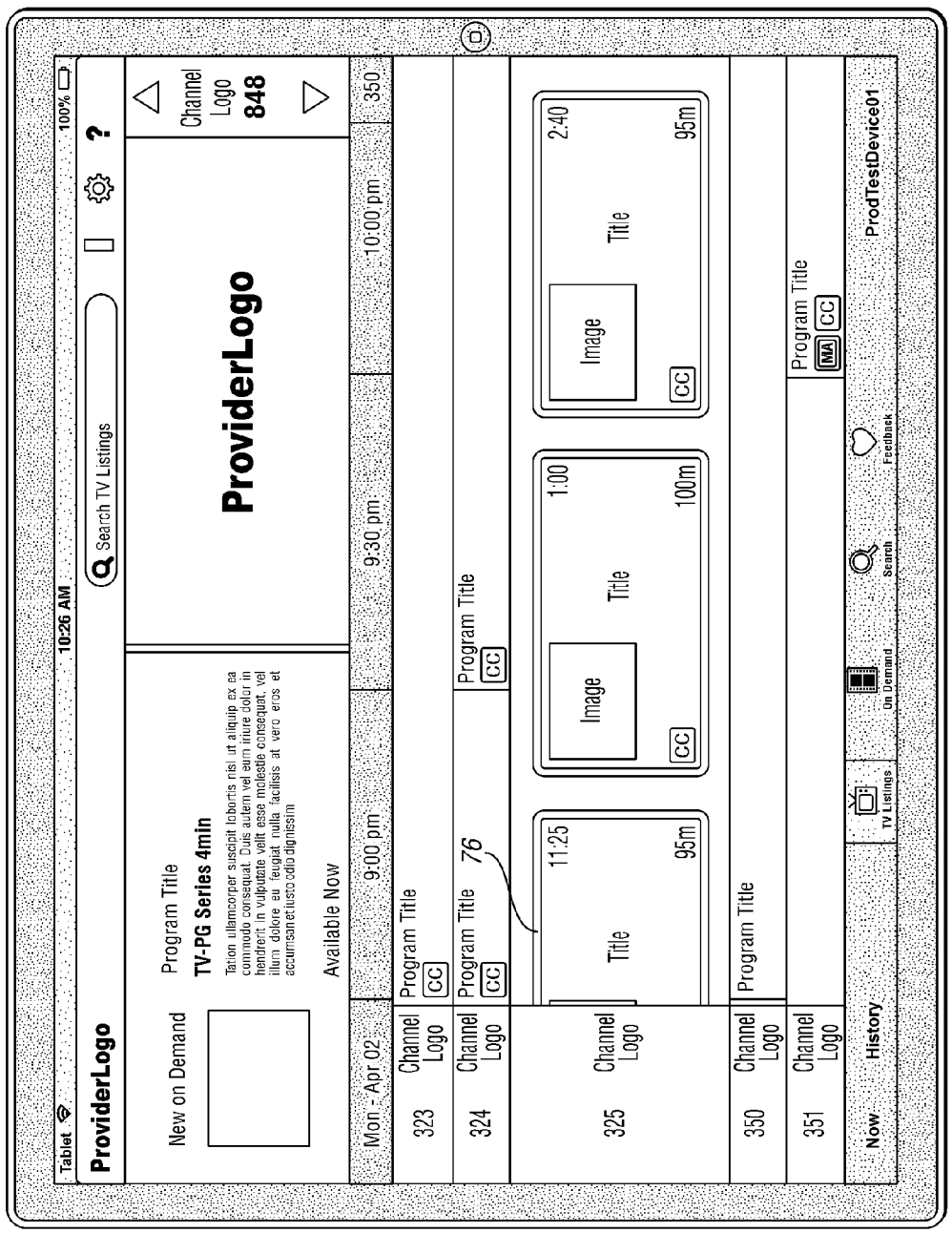

FIG. 5 illustrates scrolling of the user interface 20 where the directional dragging corresponds with a generally horizontal, leftward movement beginning within the reading lens portion. This directional dragging may correspond with selection of the display proximate the third reading lens cell 74 shown in FIG. 4 and preceding in a leftward direction therefrom until the third reading lens cell 76 is positioned at the location shown in FIG. 5. FIGS. 6-7 illustrates scrolling of the user interface where the directional dragging corresponds with a generally horizontal, leftward movement beginning within the grid portion 28. FIG. 6 illustrates the beginning of the directional dragging corresponding with approximately 11:30 PM. FIG. 7 illustrates an ending of the directional dragging corresponding with approximately 11 PM such that the program information is shifted by one half hour. The one half hour scrolling may be proportional to the viewing time increments of the first timeline such that the one half hour change corresponded with a directional dragging having a distance approximate equal to a width of one of the viewing time intervals.

The scrolling described above with respect FIGS. 6-7 may be considered to be a linear type of movement in that the program information change by a single increment of the viewing time axis, i.e., the channel number, such that information next shown within the reading lens portion correspond with information associated with the immediately preceding channel number. The scrolling described with respect to FIGS. 4-5 may be considered to be a non-linear type of movement in that program information changes by an amount approximately equal to a summation of the remaining running time of the programs illustrated within the reading lens portion as measured between the program of the beginning of the directional dragging and the earliest viewing time shown within the display i.e., the viewing time corresponding with the leftward edge adjoining the channel numbers. More specifically, the non-linear change in viewing time may correspond with a summation of the running time associated with the selected or most closely selected reading lens grid and its relative movement toward the channel number column where the distance is proportional to the remaining running time of the intermediary reading lens portion programs.

If there is only one intermediate reading lens program and it has a running time of 120 minute whereas a leftward edge of the corresponding reading lens has not exceed the channel number column 22 and it is thereafter moved leftward by an amount sufficient to position its rightward edge just leftward of the displayed rightward edge of the channel number column 22, the viewing time shown within the first timeline will shift by 120 minutes. With respect to the provided illustrations, the scrolling shown with FIGS. 4-5 correspond with a timing change of three hours whereas the scrolling shown with FIGS. 6-7 correspond with the time change of a half-hour. Even though the distance of the two directional dragging events associated with FIGS. 4-5 and FIGS. 6-7 were approximately equal, the viewing time shifted differently depending on whether the dragging event began within the reading lens portion 30 or whether the dragging event began within the grid portion 28. The illustrated speed difference may be proportional to the viewing time increments associated with the first timeline when the dragging events begins with the grid portion and to the remaining running times of the displayed programs when the dragging event begins within the reading lens portion.

While the foregoing figures show the display with approximately the top 30% of the screen being occupied by additional information, the present invention fully completes eliminating this portion in favor of increasing the size of one or both of the grid portion and/or reading lens portion. In the illustrated representations, the central section of the normal grid has been replaced by the expanded view. The user can still scroll the grid up and down to view information about channels above or below the viewing limits of the presenting device. As a channel enters the expanded section, the presentation of the program detail may change from simple text to a graphical representation showing expanded information about the programs. In order to create a natural feeling of scrolling the grid information as a continuous piece of paper under a type of transformative "reading lens", the act of moving vertically between channels may occur by scrolling the expanded view with an appropriately scaled (linearly faster) motion. As one text grid cell rolls into the expanded view, one expanded cell rolls out of the expanded view, and becomes one text grid cell on the opposite side of the expanded view.

Another facet of the invention is to have the expanded view have a separate time representation from the plain parts of the grid. In this manner, the expanded view can have fixed width programs information tiles. As TV programs differ in length, maintaining a one to one match between the plain grid and the expanded grid would require different width program detail tiles. This is particularly problematic for short programs (such as 15 minutes or less), and for longer than average programs (such as 3 hours). To address these problems a method of supporting fixed width expanded tiles may be adopted. Each expanded view tile can represent a different length program. For example the left-most tile (program 1) could represent a 30 minutes program, while the second tile (program 2) could represent a 2 hour movie. When the user chooses to horizontally scroll within the expanded (center) view, the rest of the grid scrolls in a non-linear fashion. As such, moving the program 1 tile off the left of the screen would move the text grid schedule by 30 minutes to the left, in a scaled-linear rate of transition to match the program 1 tile moving off the screen. Then moving the program 2 expanded information tile off the left of the screen would result in the text grid moving 2 hours left off the screen in a scaled-linear fashion.

While the example shown herein chose to provide graphical alternate representations in the expanded view, it is not restricted to this. It could equally have an expanded text information tile, or any other transformation on the information about the program. While example shown herein shows fixed-size tiles in the expanded view, alternate approaches are possible where the expanded information tiles are maintained at the same width as the corresponding programs in the regular grid.

Figure 8:
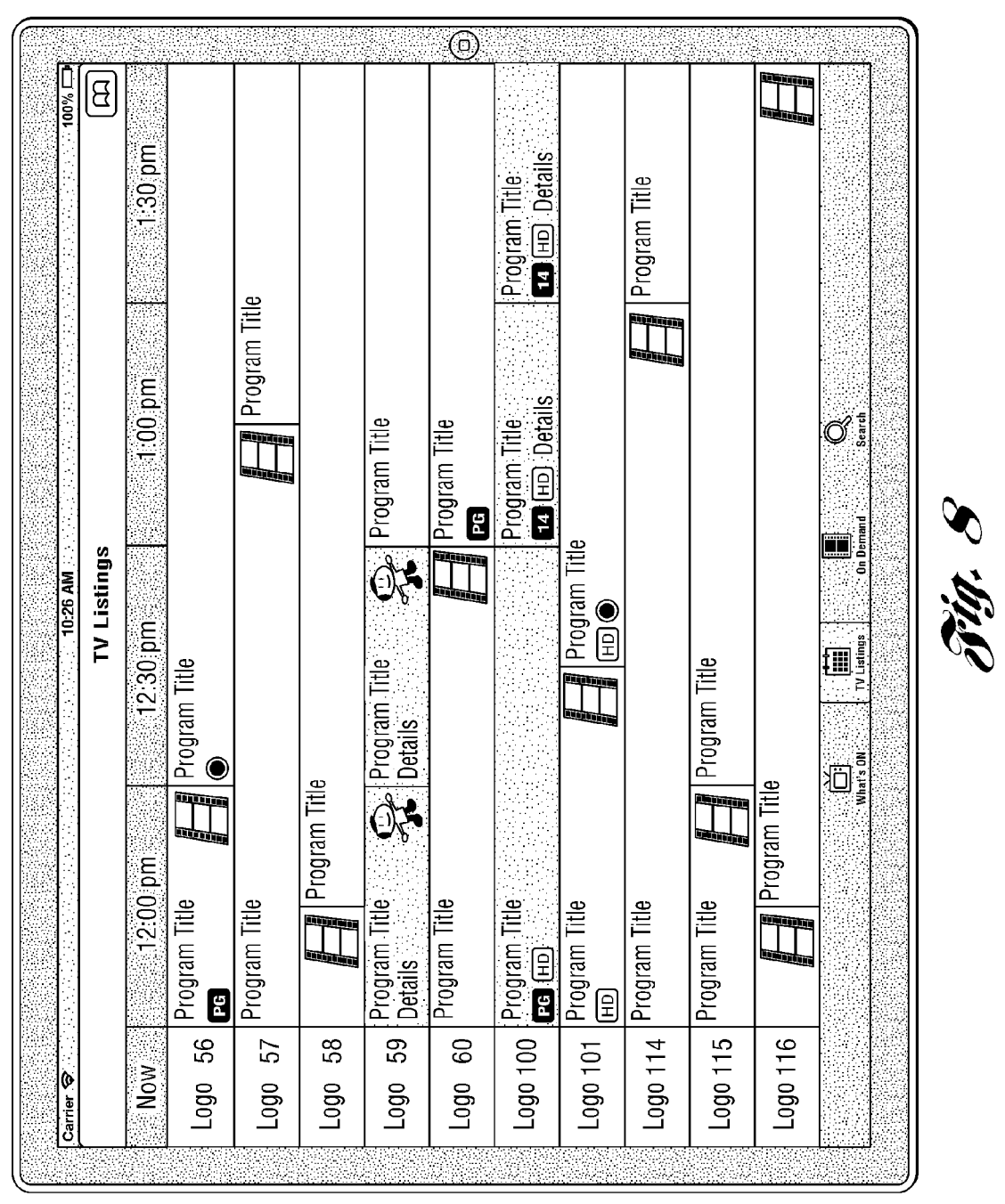

Another aspect of the invention is the use of visual clues to the type and features of the content within the regular grid. FIG. 8 illustrates such an arrangement. In this representation, the use of iconic information may be used as the background of the text boxes that represent each program—a film strip for a movie, and a child for children's content. It also shows iconic information to represent the parental rating, closed captioning, high definition content and "New releases".

As supported above, the invention may provide a navigation experience for users wanting to navigate large amounts of guide data, keeping dense summary information, but allowing expanded information within the area of focus that the user selects. It solves the problem of trading navigating large numbers of programs and/or channels, without overwhelming the user with masses of information, while also allowing the user to see expanded information quickly, easily and I intuitively.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A user interface operable to execute on a mobile device, the user interface operable to facilitate issuance of wireless command signals from the mobile device to an output device, the wireless command signals controlling the output device to tune to a television channel selected from a plurality of available television channels, the user interface operable to facilitate:

rendering a graphical display;

graphically representing a first portion of the available television channels within a grid portion of the graphical display, the grid portion graphically representing television programs associated with the first portion of television channels according to a linear increment of time;

graphically representing a second portion of the plurality of available television channels within a reading lens portion of the graphical display, the reading lens portion graphically representing television programs associated with the second portion of television channels according to a non-linear increment of time;

determining the television channel to correspond with a selected portion of the graphical display, the selected portion corresponding with one of the first portion of television channels graphically represented within the grid portion and the second portion of television channels graphically represented within the reading lens portion;

performing a scrolling of television programs graphically represented within the graphical display in response to a directional dragging of one of the grid portion and the reading lens portion;

performing the scrolling according to the linear increment of time in the event the directional dragging begins within the grid portion and according to the non-linear increment of time in the event the directional dragging begins within the reading lens portion;

setting the non-linear increment of time according to the television program displayed at an area corresponding with a beginning of the directional dragging; and setting the non-linear increment of time to be one hour in the event the television program displayed at the area has a remaining running time of one hour and setting the non-linear increment of time to be two hours in the event the remaining running time is two hours.

2. The graphical user interface of claim 1 further comprising setting the linear increment of time to a fixed value regardless of a running length of the television program displayed at an area corresponding with a beginning of the directional dragging.

3. The graphical user interface of claim 1 further comprising performing the scrolling such that television programs showing within both of the grid portion and the reading lens portion scroll at the same speed, the speed corresponding with the one of the linear increment of time and the non-linear increment of time corresponding with a beginning of the directional dragging.

4. The graphical user interface of claim 1 further comprising scrolling a second television channel displayed within the grid portion to the reading lens portion, the second television channel displayed according to the non-linear increment of time when displayed within the reading lens portion.

5. The graphical user interface of claim 1 further comprising:

displaying each of the television programs within the grid portion within a separate grid cell, each grid cell being displayed with the same first height; and displaying each of the television programs within the reading lens portion within a separate reading lens cell, each reading lens cell being displayed with the same second height, the second height being greater than the first height such that each reading lens cell provides an expanded view of the corresponding television program.

6. The graphical user interface of claim 5 further comprising displaying each grid cell with a width proportional to a running length of the corresponding television program.

7. The graphical user interface of claim 5 further comprising displaying each reading lens cell with the same width regardless of the running length of the corresponding television program.

8. A method of facilitating selection of a television program comprising:

representing television program information within a grid portion of a display, the grid portion displaying television program information within a corresponding one of a plurality of grid cells, each grid cell having a proportional width approximating a running length of a corresponding television program;

representing television program information within a reading lens portion of the display, the reading lens portion displaying television program information within a corresponding one of a plurality of reading lens cells, each reading lens cell having a fixed width, the fixed width being the same for each reading lens cell; and determining the television program to correspond with a selected portion of the display;

performing a scrolling of television program information represented within the display in response to a directional dragging of one of the grid portion and the reading lens portion, the scrolling being performed differently depending on whether the directional dragging event begins within the grid portion or the reading lens portion;

performing the scrolling according to a fixed increment of time in the event the directional dragging begins within the grid portion and according to a dynamic increment of time in the event the directional dragging begins within the reading lens portion; and performing the scrolling such that television program information showing within both of the grid portion and the reading lens portion scroll at the same speed, the speed corresponding with the one of the fixed or dynamic increment of time corresponding with where the directional dragging begins.

9. The method of claim 8 further comprising setting the dynamic increment of time to be approximately equal to a remaining running length of the television program displayed at an area corresponding with a beginning of the directional dragging.

* * * * *